United States Patent Office 3,366,681
Patented Jan. 30, 1968

3,366,681
PROCESS FOR THE RECOVERY OF METHIONINE
Jozef A. Thoma, Vaals, and Johannes H. C. M. A. Grégoire, Beek, Netherlands, assignors to Stamicarbon N.V., Heerlen, Netherlands
No Drawing. Filed Sept. 30, 1965, Ser. No. 491,808
Claims priority, application Netherlands, Oct. 2, 1964, 64—11,467
2 Claims. (Cl. 260—534)

The present invention relates to a process for the recovery of methionine, from an aqueous solution containing methionine, and ammonium sulphate.

In a number of procedures for the preparation of methionine, the conditions of methionine formation are such that an aqueous solution is obtained which contains methionine, or a salt thereof, and a quantity of ammonium sulphate. The methionine must be removed from such a solution, generally by crystallization of the methionine. Not all the methionine is recovered in this way, however, and some is left in the mother liquor. This latter portion of the methionine product can be recovered only with difficulty.

In U.S. Patent 2,071,282 it is proposed to recover amino acids from aqueous solutions of the same also containing ammonium sulphate by adding ammonia to precipitate the ammonium sulphate. The amino acid, it is said, can then be recovered from the filtrate. However, with this method, the yield of the recovery of amino acids is adversely affected by the fact that some of the amino acid is precipitated with the ammonium sulphate.

According to another known method, disclosed in U.S. Patent 2,564,105, a solution containing methionine and ammonium sulphate is evaporated to dryness under reduced pressure, and the solid residue is then subjected to repeated extraction with liquid ammonia. The methionine dissolves in the liquid ammonia and is obtained in the pure state after evaporation of the ammonia. However, this method is very laborious and uses much energy.

The present invention provides a new and improved process for recovering methionine from aqueous solutions containing methionine and ammonium sulphate, which process does not involve the disadvantages attached to the above-mentioned known methods. This new process is characterized by subjecting the said solution to liquid-liquid extraction with ethanol, and methionine or its salt is recovered from the resulting fraction rich in ethanol. Contrary to expectation, this process yields an ethanol-rich fraction in which the ratio of methionine to the ammonium sulphate is considerably higher than that in the starting solution, while the aqueous fraction rich in ammonium sulphate contains hardly any methionine. This is quite surprising because it is common knowledge that methionine is substantially less soluble in ethanol than in water.

Naturally, this extraction can be effected only under circumstances where liquid phase separation takes place in the ethanol-ammonium sulphate-water system. Whether phase separation will take place depends i.a. on the ammonium sulphate content of the aqueous solution to be extracted. At very low ammonium sulphate concentrations, there will be no separation into two liquid phases, and the solution must first be concentrated.

Further, the temperature must be at least 8° C. to permit formation of two liquid phases. At that temperature, the concentration of ammonium sulphate in the liquid to be extracted should be at least 40 grams per liter. The temperature used is preferably higher than 30° C. since at such temperatures the separation coefficient is very favorable. In addition, there is the further advantage that the ethanol-rich fraction will contain less ammonium sulphate, while the aqueous ammonium sulphate fraction will contain less ethanol.

It will be understood that the methionine product may be obtained in the form of a salt, the same having been formed in the sulphate solution. Accordingly, the term "methionine" as used herein is intended to embrace methionine, the mineral acid salts of methionine which may appear in situ in the aqueous solution obtained from the manufacturing process or otherwise; or ammonium or comparable salts obtained by neutralisation of the aqueous solution obtained from the manufacturing process.

The process of this invention even renders it possible to recover methionine from solutions containing very small amounts thereof, compared with the amount of ammonium sulphate, as, for example, from the mother liquor left after the methionine has been largely recovered from a methionine-containing ammonium sulphate solution by crystallization.

The process according to the invention can also be conveniently carried out as a continuous process.

The said process will be elucidated by means of the following examples, without being restricted thereto.

*Example 1*

In the preparation of methionine, methionine was continuously recovered by crystallization from an aqueous solution containing methionine and ammonium sulphate. The remaining mother liquor, which contained 35% by weight of ammonium sulphate and only 0.8% by weight of methionine, was subjected to a continuous countercurrent extraction with aqueous 65%-by-weight ethanol at a temperature of 70° C.

The extraction was carried out with 960 g. of ethanol per kg. of mother liquor and yielded 1285 grams of an ethanol-rich fraction and 675 grams of an ammonium-rich fraction (the amounts mentioned hereinafter are also expressed per kg. of mother liquor).

930 and 30 grams of aqueous 65%-by-weight ethanol were then recovered, respectively, from the ethanol-rich fraction and from the fraction rich in ammonium sulphate, and recycled to the extraction. The fraction rich in ammonium sulphate yielded 645 grams of a 45%-by-weight ammonium sulphate solution, and the fraction rich in ethanol yielded 355 grams of an aqueous solution containing 2.2% by weight of methionine and 15% by weight of ammonium sulphate.

From this methionine-containing solution, the methionine was recovered by returning the solution to the methionine crystallization.

*Example 2*

An aqueous solution containing 43% by weight of ammonium sulphate and 0.5% by weight of methionine, was continuously countercurrently extracted with aqueous 71%-by-weight ethanol at 70° C. (The amounts mentioned hereinafter are also expressed per kg. of the solution to be extracted.)

Using 860 grams of ethanol, 955 grams of a fraction rich in ammonium sulphate and 905 grams of a fraction rich in ethanol were obtained. 40 and 820 grams of aqueous 71%-by-weight ethanol were then recovered, respectively, from the fraction rich in ammonium sulphate and from the fraction rich in ethanol, and fed back to the extraction. From the fraction rich in ammonium sulphate 915 grams of an ammonium sulphate solution containing 420 grams of ammonium sulphate were obtained, and from the fraction rich in ethanol 85 grams of an aqueous solution containing 5 grams of methionine and only 7.5 grams of ammonium sulphate. This methionine-containing solution was then cooled to 0° C., as a result of which methionine crystallized out. 4 grams of methionine were removed by filtration. The remaining mother liquor, which still contained some methionine, was recycled to the methionine-preparation process at a suitable point.

Example 3

An aqueous solution containing 40%-by-weight of ammonium sulphate and 0.8%-by-weight of methionine sulphate, was subjected to a continuous countercurrent extraction with aqueous 68%-by-weight ethanol at a temperature of 70° C. (The amounts hereinafter are expressed per kg. of the solution to be extracted.)

Using 910 g. of ethanol, 986 g. of a fraction rich in ammonium sulphate and 924 g. of a fraction rich in ethanol were obtained. From the fraction rich in ammonium sulphate 65 g. of aqueous 68%-by-weight ethanol and from the fraction rich in ethanol 845 g. of aqueous 68%-by-weight ethanol were recovered and fed back to the extraction. From the fraction rich in ammonium sulphate 921 g. of an ammonium sulphate solution containing 385 g. of ammonium sulphate were obtained, and from the fraction rich in ethanol 79 g. of an aqueous solution containing 7–8 g. of methionine sulphate and 15 g. of ammonium sulphate. This solution was recycled to the methionine-preparation process at a suitable point.

What is claimed is:
1. A process for the recovery of methionine from an aqueous solution containing methionine and ammonium sulphate, wherein said solution is subjected to a liquid-liquid extraction with ethanol, at a temperature of at least 8° C. wherein the concentration of ammonium sulfate in said aqueous solution is at least sufficient to cause two liquid phases to separate at the temperature of the extraction, forming an alcohol-rich phase and a predominantly aqueous phase with ammonium sulphate, and recovering methionine from the ethanol-rich fraction.
2. Process according to claim 1 wherein the extraction is carried out at a temperature above 30° C.

References Cited
UNITED STATES PATENTS

| | | | |
|---|---|---|---|
| 2,443,391 | 6/1948 | Kirkpatrick | 260—534 |
| 2,504,425 | 4/1950 | Kralovec | 260—534 |
| 2,775,616 | 12/1956 | Holland | 260—534 |

LORRAINE A. WEINBERGER, *Primary Examiner.*

A. P. HALLUIN, *Assistant Examiner.*